United States Patent [19]
Hammann

[11] 3,877,179
[45] Apr. 15, 1975

[54] WORK LOCATING DEVICE FOR GRINDING MACHINES

[75] Inventor: Ernst Hammann, Dietzenbach, Germany

[73] Assignee: Cincinnati Milacron Inc., Cincinnati, Ohio

[22] Filed: Jan. 25, 1974

[21] Appl. No.: 436,469

[30] Foreign Application Priority Data
Feb. 13, 1973 Germany............................ 7305282
July 10, 1973 Germany............................ 2334932

[52] U.S. Cl.......... 51/165 R; 51/165.71; 51/165.83; 51/165.92
[51] Int. Cl............................................ B24b 49/02
[58] Field of Search........ 51/165 R, 165.75, 165.77, 51/165.92, 165.8, 165.83, 165.71

[56] References Cited
UNITED STATES PATENTS
2,559,931 7/1951 Hollengreen................. 51/165.75 X
3,690,072 9/1972 Price................................. 51/165 R
3,741,071 6/1973 Hoglund.......................... 51/165.92

*Primary Examiner*—Harold D. Whitehead
*Attorney, Agent, or Firm*—Howard Keiser

[57] ABSTRACT

An apparatus for automatically aligning the center of a workpiece on the table of a grinding machine with the center of a grinding wheel mounted on the base of the machine, which includes a gaging device on the table for measuring the size of the workpiece and another gaging device on the base of the machine for measuring the position of the table together with a drive means for moving the table in the appropriate direction to reduce any difference between the two measurements to zero.

4 Claims, 3 Drawing Figures

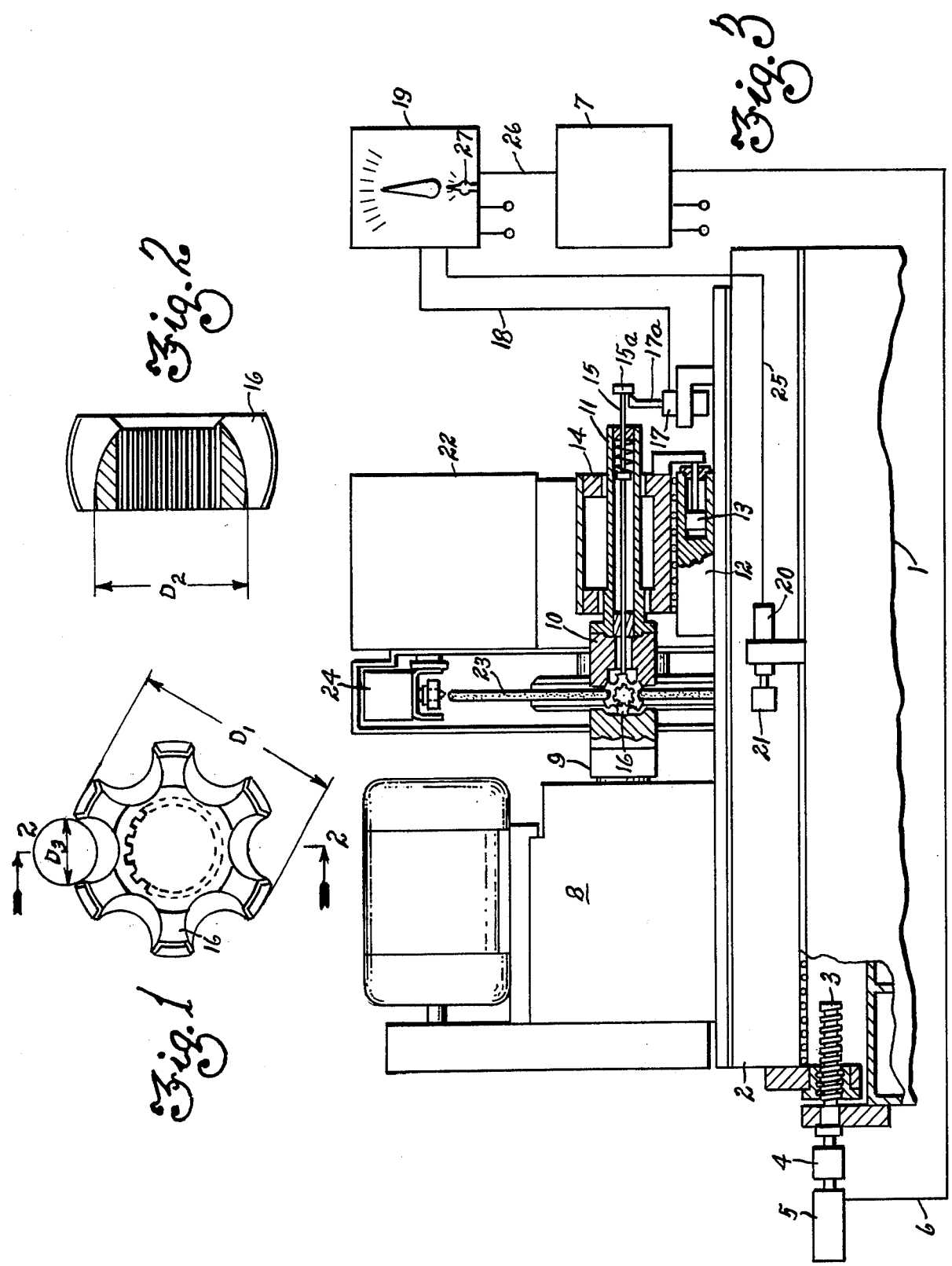

WORK LOCATING DEVICE FOR GRINDING MACHINES

BACKGROUND OF THE INVENTION

This invention relates to abrading machines of the type using an external rotary tool having a peripheral grinding face, and a rotary workholder mounted on a table arranged for rectilinear movement relative to the tool to permit the center of the workpiece to be accurately aligned with the center of the wheel after which the tool is fed into the workpiece as the latter is rotated to grind an arcuate groove of the desired configuration in the exact geometrical center of the workpiece.

In the past when a number of parts were to be ground in this fashion, it was necessary to group the parts according to size before grinding so as to insure that the grooves would be located in the exact center of the parts. Prior art flagging devices are of no help in the solution of this problem since they merely serve to position a shoulder on the part in a fixed location with respect to the tool. No other known gaging system is applicable to this problem and it has, therefore, been necessary to devise a new and hitherto unknown arrangement to permit accurate centering of the groove in parts which are subject to normal tolerance limits.

SUMMARY OF THE INVENTION

The present invention eliminates the need for grouping of the parts according to size before grinding the same by the provision of a new form of gaging means which automatically positions the table to center the wheel on the part even though it may be slightly greater or slightly smaller than normal. This is accomplished through the use of two gaging devices, one of which measures the size of the workpiece after it has been placed in the workholder of the machine, and other of which measures the position of the table with respect to the tool. The outputs from the two gaging devices are then compared to provide a difference signal. This signal is applied to a table drive motor which adjusts the position of the table until the difference signal is reduced to zero. Since the workpiece gaging signal is arranged to be only one-half the intensity of the table gaging signal, the table position will automatically be adjusted by an amount equal to one-half of the size variation of the part and thereby align the center of the wheel with the center of the part.

BRIEF DESCRIPTION OF THE DRAWINGS

FIG. 1 is a front elevation of a workpiece.

FIG. 2 is a cross-sectional view of the workpiece taken on the line 1—1 in FIG. 1.

FIG. 3 is a front elevation, partially in cross-section, of a grinding machine to which the invention is shown applied.

DESCRIPTION OF THE PREFERRED EMBODIMENT

The present invention is shown herein as applied to the grinding of the spherical center portion of a universal joint of the Rzeppa type. The workpieces are chucked on the outside diameter and then are divided automatically in accordance with the present invention. Chucked in this way, the position of the workpiece relative to the grinding wheel is greatly dependent on the tolerance allowed on the outside diameter. Although the outside diameter of this particular part has a large tolerance on the part drawing, it is necessary to hold the diameter to within a few one hundred thousandths of an inch to guarantee the accurate chucking required for precise location of the raceways ground around the periphery of the part. Since such precision machining of the outside diameter is impractical, it heretofore has been necessary to resort to tolerance grouping of the parts prior to grinding the raceways.

The purpose of the present invention is to obtain an accurate location of the center of the workpiece profile relative to the center of the grinding wheel profile irrespective of variations in the outside diameter of the workpiece thereby eliminating the need for tolerance grouping. This is accomplished through the use of a gage head on the table which measures the clamped workpiece on its diameter and emits signals indicative of the oversize or undersize condition of the workpiece. A second gage head is fastened to the bed and emits signals indicating the position of the table relative to a reference or datum position. The signals from the two gage heads may be suitably amplified, care being taken to see that the signals from the first gage head measuring the diameter of the part have a sensitivity equal to one-half that of the signals emitted by the second gage head. The signals from the two gage heads are passed to a control device where they are compared and the output used to operate the table in the direction and to the extent required to bring the center of the workpiece into zero position relative to the center of the grinding wheel profile. After the table is thus positioned, the grinding cycle may start.

Referring now to FIG. 3, mounted on a bed 1 of a center-type grinder is a movable table 2. Table movement is effected by a drive-train consisting of a ball screw 3, a drive unit 4, and a servo motor 5 which is connected by an electrical conductor 6 with a servo amplifier 7. At one side of the table 2 is a workhead 8 a spindle of which carries a chuck-half 9. The other chuck-half 10 is supported on a rotatable spindle 11 journaled in a footstock. The footstock consists of a lower part 12 containing a piston drive 13 for effecting longitudinal adjustment of an upper part 14 which is movably mounted on part 12. A gage rod 15 located in spindle 11 probes with its forward end the outside diameter of a workpiece 16 mounted in the chuck and transmits the measured value via a final control element 15a to a gaging probe 17a of a gage head 17 which is connected by a conductor 18 to a gage control device 19. A second gage head 20 is fastened to the bed 1 and signals the position of the table 2 via a gage block 21 secured to the table. This signal is transmitted to the control device 19 over a conductor 25.

The grinding machine also includes a wheelhead 22 mounted on the bed 1 and fitted with a grinding wheel 23. The wheel may be trued to the required profile by a radius truing attachment 24.

The operation of the device is as follows:

The workpiece 16 is clamped by piston drive 13 between the chuckhalves 9 & 10 on its outside diameter $D_1$ (FIG. 1). Gage rod 15 senses the outside diameter of the part and transmits this information to the gage head 17 which emits a signal indicative of the oversize or undersize condition of part. The absence of a signal indicates a part of correct size. The signal from gage head 17 is transmitted via conductor 18 to control device 19 where it is amplified and compared with the amplified signal transmitted via conductor 25 from gage head 20. The difference signal, if any, is transmitted by a conductor 26 to the servo amplifier 7 which will energize the motor 5 and drive the table 2 in the proper direction to reduce the difference signal to zero. The motor will then stop and the wheel will be correctly aligned with the workpiece so that the grinding cycle may now begin. During grinding, the chuck is turned so as to grind the arcuate ballrace with a diameter $D_2$ (FIG. 2) and a profile $D_3$ (FIG. 1).

After grinding the first profile, the workpiece is indexed to move the next ballrace into position for grinding. Prior to grinding, however, the table positioning sequence will be repeated to insure perfect alignment of the wheel with the workpiece. The positioning - grinding sequence will be repeated until all of the ballraces have been ground, after which the part is removed from the chuck and replaced with the next workpiece to be ground.

Zero setting of the control may be effected by a knob 27 (FIG. 3) so as to permit the position of the table to be adjusted relative to the grinding wheel during set-up of the machine.

What is claimed as new and desired to be secured by Letters Patent of the United States is:

1. Apparatus for automatically aligning the center of a workpiece on the table of a grinding machine with the center of a grinding wheel mounted on the base of the machine where the workpieces to be ground are not identical as to size, comprising chuck means mounted on the table for holding the workpiece to be ground, a first gage means for measuring the size of a workpiece held in said chuck means, a second gage means for measuring the position of the table relative to the grinding wheel, means for comparing the measurements furnished by the two said gaging means and providing a difference signal in response to a variation in the size of the workpiece, and drive means controlled by said difference signal for adjusting the position of the table as necessary to reduce the signal to zero thereby centering the workpiece on said grinding wheel.

2. The apparatus of claim 1 wherein said chuck means includes a first chuck-half mounted on a headstock spindle, and a second chuck-half mounted on a tailstock spindle, and wherein said first said gage means includes a gaging rod movably mounted in said tailstock spindle and contacting the outside diameter of a workpiece held in the chuck.

3. The apparatus of claim 1 wherein manually settable means is provided for adjusting the zero-setting of said measurement comparing means.

4. The apparatus of claim 1 wherein the scale of the measurement signal furnished by said first gage means is one-half the scale of the measurement signal furnished by said second gage means.

* * * * *